United States Patent [19]

Wijnhoven et al.

[11] 4,076,276
[45] Feb. 28, 1978

[54] BASE VALVE FOR INDEPENDENT WHEEL SUSPENSION STRUT

[75] Inventors: Jan M. A. Wijnhoven, Sint-Truiden; Alexandru Oancea, Zepperen; Henri C. J. Vanhove, Gelmen; Roland H. C. Beets, Sint-Truiden, all of Belgium

[73] Assignee: Monroe Auto Equipment Company, Monroe, Mich.

[21] Appl. No.: 704,016

[22] Filed: Jul. 9, 1976

[51] Int. Cl.² ............................................. B60G 11/56
[52] U.S. Cl. .................................. 280/714; 188/315; 188/322; 267/64 R
[58] Field of Search ............... 280/709, 714; 188/315, 188/322; 267/64 R

[56] References Cited

U.S. PATENT DOCUMENTS

| 3,378,110 | 4/1968 | Parrish | 188/315 |
| 3,519,109 | 7/1970 | Whisler | 188/315 |
| 3,722,639 | 3/1973 | Keijzer | 188/315 |
| 3,763,970 | 10/1973 | Anderson | 188/315 |
| 3,874,487 | 4/1975 | Keijzer | 188/315 |
| 3,945,474 | 3/1976 | Palmer | 188/322 |

Primary Examiner—Joseph F. Peters, Jr.
Assistant Examiner—John A. Carroll
Attorney, Agent, or Firm—Harness, Dickey & Pierce

[57] ABSTRACT

A base valve assembly for an independent wheel suspension strut. The assembly includes a valve body having a central axially extending opening and first and second pluralities of radially spaced axially extending flow ports, a valve pin extending axially through the central opening of the valve body, and first and second valve discs for blocking fluid flow through the flow ports, a third valve disc engageable with a valve seat to block fluid flow from a valve chamber located on the lower side of the valve body and the fluid reservoir, and a spring for selectively urging the respective valves toward their positions blocking fluid flow through the flow ports.

18 Claims, 5 Drawing Figures

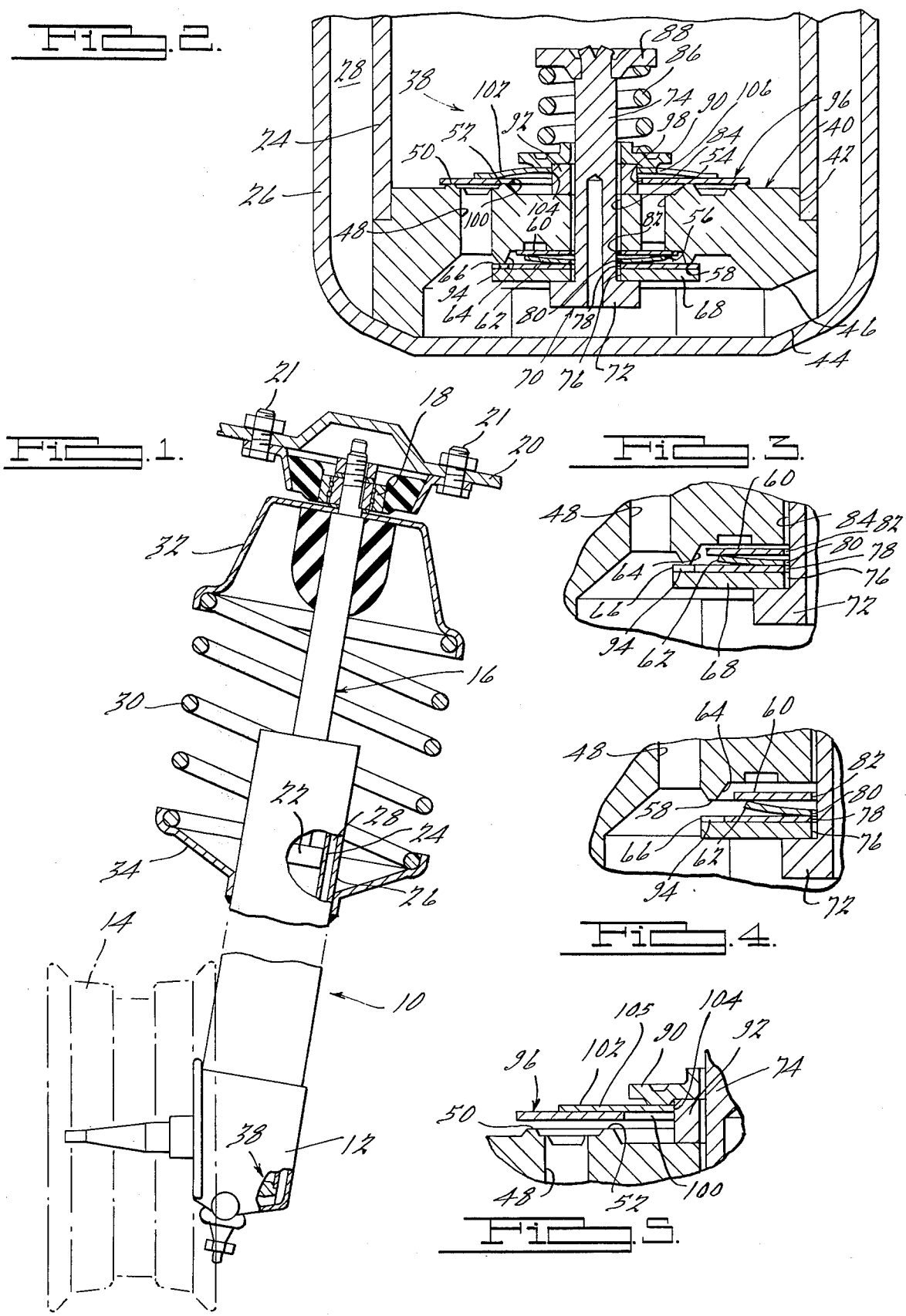

BASE VALVE FOR INDEPENDENT WHEEL SUSPENSION STRUT

BACKGROUND AND SUMMARY OF THE INVENTION

The present invention is generally directed toward vehicle suspensions and more particularly, toward a new and improved base valve assembly for use in a MacPherson-type independent wheel suspension strut.

It is accordingly a general object of the present invention to provide a new and improved base valve assembly for independent wheel suspension struts of the MacPherson type and which incorporate relatively large diameter piston rods that are interconnected between the valved piston of the strut and the sprung portion of the associated vehicle.

It is a related object of the present invention to provide a new and improved base valve assembly for the above type application which has normally closed bleed openings, but which provides for large bleeds at low operational piston speeds to accommodate for the relatively large diameter piston rod.

It is yet another object of the present invention to provide a new and improved base valve of the abovedescribed type wherein the normally downwardly depending coil spring is located on the upper side of the valve body, whereby to minimize dead length of the unit.

It is a further object of the present invention to provide a new and improved base valve assembly, as above described, which is of a relatively simple design, is economical to manufacture and will have a long and effective operational life.

Other objects and advantages of the present invention will become apparent from the following detailed description taken in conjunction with the accompanying drawing.

BRIEF DESCRIPTION OF THE DRAWING

FIG. 1 is a side elevational view, partially broken away, of an independent wheel suspension strut incorporating the principles of the present invention therein;

FIG. 2 is an enlarged fragmentary cross-sectional view of the wheel suspension strut shown in FIG. 1 and illustrates the base valve assembly of the present invention;

FIG. 3 is an enlarged fragmentary cross-sectional view of a portion of the base valve assembly shown in FIG. 2;

FIG. 4 is a view similar to FIG. 3 and illustrates certain of the valve elements therein in a transposed position; and FIG. 5 is an enlarged fragmentary cross-sectional view of another portion of the base valve assembly shown in FIG. 2.

DETAILED DESCRIPTION OF THE PREFERRED EMBODIMENT

Referring now in detail to the drawings and particularly to FIG. 1 thereof, a wheel suspension strut 10, in accordance with one preferred embodiment of the present invention, is shown as comprising a wheel spindle 12 upon which a suitable automotive or similar type vehicle wheel 14 is operatively mounted. The suspension strut 10 includes a piston rod 16 which has the upper end thereof rotatably connected by means of a suitable bearing assembly 18 to a sprung portion of an associated automotive vehicle, representatively designated by the numeral 20. The opposite or lower end of the piston rod 16 is provided with a valved piston assembly 22 which is reciprocably disposed within a pressure tube or cylinder 24 located within and concentrically oriented relative to an outer reserve tube 26 that defines a fluid reservoir 28 with the outer periphery of the tube 24. As is well known in the art, the interior of the pressure tube 26 is provided with a quantity of hydraulic fluid which is cooperable with valve means on the piston assembly 22 for damping reciprocable movement of the piston assembly 22 within the pressure tube 24 and hence damping relative movement between the wheel 14 and the spring supported vehicle portion 20. A suitable vehicle coil spring 30 may be provided on the strut 10 concentrically of the piston rod 16, such as is indicated by the numeral 30. The spring 30 is shown as being supported between upper and lower spring support members 32 and 34 which are connected to the piston rod 16 and reserve tube 26, respectively, in a manner well known in the art.

As best seen in FIG. 2, a compression or base valve assembly, generally designated by the numeral 38 and constructed in accordance with the principles of the present invention, is located at the lower end of the pressure and reserve tubes 24, 26. The valve assembly 38 includes a generally annular shaped valve body 40 that is formed with a peripheral groove or recess 42 around the upper edge thereof which is adapted to nestingly receive the lower end of the pressure tube 24. The lower side of the valve body 40 is chamfered, as seen at 44, and is formed with a plurality of circumferentially spaced recesses or notches 46 which are communicable with the reservoir 28 and with the underside of the valve body 40. The valve body 40 is formed with a plurality of circumferentially spaced, axially extending valve ports, one of which is shown in FIG. 2 and designated by the numeral 48. The ports 48 are located between a pair of axially upwardly extending, concentrically oriented valve seats 50 and 52 which are adapted to be selectively engaged by a valve means hereinafter to be described for blocking fluid flow upwardly from the underside of the valve assembly 38 into the interior of the pressure tube 44. The valve body 40 is also formed with a plurality of circumferentially spaced axially extending inner valve ports which are located radially inwardly from the valve ports 48 and one of which is shown in FIG. 2 and designated by the numeral 54. The lower ends of the valve ports 54 terminate at a generally flat radially extending surface 56 on the underside of the valve body 40 and around which an axially downwardly extending annular valve seat 58 is located. As will hereinafter be described, the valve ports 54 function to selectively communicate hydraulic fluids from the interior of the pressure tube 24 to the underside of the valve assembly 38 and hence to the reservoir 28 via the plurality of notches or recesses 46.

As previously mentioned, the valve assembly 38 includes valve means for selectively opening and closing the plurality of inner valve ports 54, which valve means includes a generally flat annular valve disc 60 that is adapted to bear directly against a surface 56 and be resiliently maintained in said position by means of a valve spring 62 that is located directly below the disc 60, whereby to block fluid flow downwardly through the ports 54 into an annular valve chamber 64 defined in part by the surface 56 and valve seat 58. Disposed axially below the valve spring 62 is a second generally annular flat valve disc 66 which is adapted for engagement with the valve seat 58 for blocking fluid flow from the valve chamber 64 into the area directly below the valve assembly 38 and hence prevents hydraulic fluid flow from the ports 54 into the reservoir 28. The valve disc 66 is disposed directly above an annular support member or washer 68.

Extending generally coaxially of the valve assembly 38 is a central valve pin, generally designated by the numeral 70, which includes an enlarged diameter lower head or shoulder portion 72 and a generally cylindrically shaped shank section 74. The valve pin section 74 extends through central openings 76, 78, 80 and 82 in the support member 68, valve disc 66, spring 62 and valve disc 60, respectively, for concentrically orienting these components relative to the valve body 40. The shank section 74 of the valve pin 70 also extends through a central opening 84 in the valve body 40 and the upper end thereof extends upwardly into the interior of the pressure tube 24, as best seen in FIG. 2. As shown, the support washer 68 and valve disc 66 are supported upon the shoulder portion 72.

Disposed concentrically around the upper end of the valve pin section 74 is a helical coil spring 86 which is supported between axially spaced upper and lower spring seats 88 and 90, respectively. The lower spring seat 90 bears upon an annular spacer member or ring 92 which in turn bears upon the upper side of the valve body 40. As will be appreciated by those skilled in the art, the coil sping 86 exerts an axially upwardly directed force against the pin 70, which in turn causes the members 66 and 68 to be biased upward toward the position shown in FIG. 2 wherein the valve disc 66 engages the valve seat 58. As best seen in FIG. 2, a plurality of circumferentially spaced radially inwardly extending bleed notches 94 are formed in the valve disc 66 at a position directly below the valve seat 58 and function to permit the bleeding or controlled flow of hydraulic fluid between the valve chamber 64 and the underside of the valve assembly 38 for purposes hereinafter to be described.

The flow of hydraulic fluid through the plurality of outer valve ports 48 is controlled in part by means of a flat annular intake valve disc, generally designated by the numeral 96, and located adjacent the upper side of the valve body 40. The valve disc 96 is formed with a central opening 98, the periphery of which is disposed directly adjacent the outer periphery of the guide member 92, whereby the member 92 will guide the valve disc 96 for axial movement toward and away from engagement with the valve seats 50, 52. The periphery of the opening 98 is formed with a plurality of circumferentially spaced, radially outwardly directed recesses 100 that provide for a fluid communication from the interior of the pressure tube 24 to the ports 54. Disposed directly above the valve disc 96 is a disc-like intake spring, generally designated by the numeral 102 which is formed with a central opening 104 within which the upper end of the guide member 92 is located. The spring 102 includes a plurality of radially outwardly and downwardly extending fingers 105 which bear against the upper side of the valve disc 96 and thereby resiliently bias the disc 96 into sealing engagement with the valve seats 50, 52. The fingers 105 define a plurality of radially disposed notches 106 therebetween which permits fluid to flow to and from the recesses in the valve disc 96 and hence to and from the plurality of inner valve ports 54. It is to be noted that the fingers 105 are deformed slightly downwardly to apply a preload of a predetermined magnitude to the upper side of the valve disc 96. It is also to be noted that the valve spring 62 may be preloaded to assure that the valve disc 60 is positively maintained with the relatively flat radial surface 56.

In operation of the suspension strut 10, the various components of the valve assembly 38 are disposed in their respective positions shown in FIG. 2 when the strut 10 is in a static condition. During low speed compression movement of the piston 22, i.e., downward movement of piston 22 within the pressure cylinder 24, the valve disc 60 will move from the position shown in FIG. 2 to the position shown in FIG. 3, whereby a limited amount of fluid may flow through the flow ports 54 and between the surface 56 and upper sides of the valve disc 60 into the valve chamber 64. This fluid may then flow between the plurality of notches 94 from the valve chamber 64 to a position below the valve body 40 and thereafter through the plurality of notches 46 into the reservoir 28. At such time as the rate of movement of the piston 22 and piston rod 16 exceed a predetermined magnitude, the valve pin 70 will move downwardly from the position shown in FIG. 2 to the position shown in FIG. 4, whereupon the valve disc 66 will move away from the valve seat 58, thereby permitting a proportionately greater amount of fluid to flow through the valve ports 54 into the reservoir 28.

At such time as the piston 22 and piston rod 16 move upwardly within the strut 10, and such upward movement of the piston 22 reaches a predetermined speed, the valve disc 50 will move upwardly away from the valve seats 50, 52 from the position shown in FIG. 2 to the position shown in FIG. 5 against the resistance of the valve spring 102. Accordingly, fluid may flow upwardly through the plurality of valve ports 48 and between the valve seats 50, 52 and the underside of the valve disc 96 into the interior of the pressure cylinder 24.

One particularly important feature of the present invention resides in the fact that the base valve assembly 38 is particularly adapted to be used with independent wheel suspensions of the MacPherson type. In such type wheel suspensions, there is a relatively large ratio between the diameter of the piston rod and the diameter of the pressure cylinder which necessitates a large replenishing valve of the type incorporated in the base valve assembly 38. Moreover, it is desirable in such type wheel suspensions to have a normally closed bleed opening, yet permit the bleed openings to become large at relatively low speed performance, as is the case with the base valve assembly 38 of the present invention. An additional feature of the present invention resides in the fact that the coil spring 86 is located above the valve body 40, as opposed to extending downwardly therebelow, as is the case in many analogous prior art designs. Accordingly, the dead length of the strut 10 may be minimized to the extreme, whereby to accommodate for compact size modern vehicles.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. A base valve assembly for a shock absorber having a pressure cylinder, a piston movable within said cylinder, a reservoir tube extending around said pressure cylinder and defining a fluid reservoir therewith, said valve assembly being located adjacent the lower end of said pressure cylinder and controlling fluid flow between said reservoir and the interior of said cylinder, said assembly including a valve body having a central axially extending opening and first and second pluralities of radially spaced, axially extending flow ports, first and second axially extending concentric valve seats on the upper side of said valve body, said valve seats being located radially opposite sides of the upper ends of said first set of flow ports, an axially extending third valve seat on the lower side of said valve body, said third valve seat being located radially outwardly from the lower ends of said second set of flow ports and partially defining a valve chamber adjacent the lower side of said valve body, a valve pin extending axially through said opening and projecting above the upper side of said valve body, a floating valve disc disposed adjacent the upper end of said valve body and being engageable with said first and second valve seats for blocking fluid flow through said first set of flow ports, said valve disc being movable upwardly away from said first and second valve seats without undergoing bending to provide flow through said first set of flow ports, first spring means for resiliently biasing said floating valve disc toward said first and second valve seats, a second valve disc disposed adjacent the lower end of said valve body and normally engaged therewith to block fluid flow through said second set of flow ports, a third valve disc disposed adjacent the lower end of said valve body and being engageable with said third valve seat to block fluid flow from said valve chamber into said reservoir, said third valve disc being mounted on said valve pin and being movable concomitantly therewith axially of said valve body to open and close a flow path between said reservoir and said chamber, and a helical coil spring extending coaxially around the upper end of said valve pin and resiliently urging said pin and said third valve disc carried thereon toward said position wherein said third valve disc closes said flow path.

2. The invention as set forth in claim 1 wherein said valve body is formed with a central cavity in the lower side thereof which is defined in part by a flat radial surface on the lower side of said valve body, said surface having the lower ends of said second set of flow ports terminate therein.

3. The invention as set forth in claim 1 wherein said spring means urging said third valve disc toward said position closing said flow path comprises a helical coil spring.

4. The invention as set forth in claim 3 wherein said spring is carried on the upper end of said valve pin.

5. The invention as set forth in claim 1 which includes a second spring means for resiliently urging said first valve disc toward engagement with said first and second valve seats.

6. The invention as set forth in claim 5 wherein said second spring means comprises a plurality of spring fingers which are deformed so as to apply a preload to said first spring disc.

7. The invention as set forth in claim 1 wherein said third valve disc is formed with a plurality of bleed orifices around the periphery thereof for communicating said chamber with said reservoir.

8. The invention as set forth in claim 2 wherein said second valve disc is movable away from said radial surface under low speed piston movement, and wherein said third valve disc is movable away from said third valve seat against the resistance of said first mentioned spring means under high speed piston movement.

9. The invention as set forth in claim 1 wherein said shock absorber is embodied in an independent wheel suspension strut.

10. The invention as set forth in claim 1 wherein said shock absorber is of the type having a large ratio of piston rod diameter to pressure cylinder diameter.

11. In an independent wheel suspension for an automotive vehicle or the like, the suspension including a pressure cylinder, a piston movable within said cylinder, a reserve tube extending around said pressure cylinder and defining a fluid reservoir therewith, an enlarged diameter piston rod connected at one end to the piston and at the opposite end to the sprung portion of the associated vehicle, and a base valve assembly for selectively communicating the interior of said reservoir with the interior of said pressure cylinder, said valve assembly being located adjacent the lower end of said pressure cylinder and controlling fluid flow between said reservoir and the interior of said cylinder, said assembly including a valve body having a central axially extending opening and first and second pluralities of radially spaced, axially extending flow ports, first and second axially extending concentric valve seats on the upper side of said valve body, said valve seats being located radially inwardly and outwardly from said first set of flow ports, an axially extending third valve seat on the lower side of said valve body, said third valve seat being located radially outwardly from said second set of flow ports and partially defining a valve chamber adjacent the lower side of said valve body, a valve pin extending axially through said opening and projecting above the upper side of said valve body, a floating valve disc disposed adjacent the upper end of said valve body and being engageable with said first and second valve seats for blocking fluid flow through said first set of flow ports, said valve disc being movable upwardly away from said first and second valve seats without undergoing bending to provide flow through said first set of flow ports, first spring means for resiliently biasing said floating valve disc toward said first and second valve seats, a second valve disc disposed adjacent the lower end of said valve body and normally engaged therewith to block fluid flow through said second set of flow ports, a third valve disc disposed adjacent the lower end of said valve body and being engageable with said third valve seat to block fluid flow from said valve chamber into said reservoir, said third valve disc being mounted on said valve pin and being movable concomitantly therewith axially of said valve body to open and close a flow path between said reservoir and said chamber, and a helical coil spring extending coaxially around the upper end of said valve pin and resiliently urging said pin and said third valve disc carried thereon toward said position wherein said third valve disc closes said flow path.

12. The invention as set forth in claim 11 wherein said valve body is formed with a central cavity in the lower side thereof which is defined in part by a flat radial surface on the lower side of said valve body, said surface having the lower ends of said second set of flow ports terminate therein.

13. The invention as set forth in claim 11 wherein said spring means urging said third valve disc toward said position closing said flow path comprising a helical coil spring.

14. The invention as set forth in claim 13 wherein said spring is carried on the upper end of said valve pin.

15. The invention as set forth in claim 11 which includes a second spring means for resiliently urging said first valve disc toward engagement with said first and second valve seat.

16. The invention as set forth in claim 15 wherein said second spring means comprises a plurality of spring fingers which are deformed so as to apply a preload to said first spring disc.

17. The invention as set forth in claim 11 wherein said third valve disc is formed with a plurality of bleed orifices around the periphery thereof for communicating said chamber with said reservoir.

18. The invention as set forth in claim 12 wherein said second valve disc is movable away from said radial surface under low speed piston movement, and wherein said third valve disc is movable away from said third valve seat against the resistance of said first mentioned spring means under high speed piston movement.

* * * * *